United States Patent
Werner et al.

[11] Patent Number: 6,041,901
[45] Date of Patent: Mar. 28, 2000

[54] TORQUE TRANSMITTER CONNECTION ASSEMBLY WITH VIBRATION DAMPER AND METHOD OF MAKING SAME

[75] Inventors: Juergen Werner, Garching; Anton Stephan, Baldham; Rahim Pour, Garching, all of Germany

[73] Assignee: Bayerische Motoren Werke Aktiengesellschaft, Germany

[21] Appl. No.: 09/174,170

[22] Filed: Oct. 16, 1998

[30] Foreign Application Priority Data

Oct. 30, 1997 [DE] Germany .................. 197 47 963

[51] Int. Cl.⁷ ........................................ F16H 45/02
[52] U.S. Cl. ................................................ 192/3.28
[58] Field of Search ........................ 192/3.29, 3.28, 192/3.3, 3.31

[56] References Cited

U.S. PATENT DOCUMENTS

| | | | |
|---|---|---|---|
| 2,597,921 | 5/1952 | Churchill et al. ............................ | 192/7 |
| 4,926,988 | 5/1990 | Kundermann ............................. | 192/3.3 |
| 5,129,493 | 7/1992 | Edmunds ............................... | 192/3.29 |
| 5,789,823 | 8/1998 | Sherman .................................. | 290/47 |
| 5,828,136 | 10/1998 | Yang ...................................... | 290/4 A |

FOREIGN PATENT DOCUMENTS

| | | |
|---|---|---|
| 0566994A1 | 10/1993 | European Pat. Off. . |
| 2732428A1 | 10/1996 | France . |
| 2337328 | 2/1974 | Germany . |
| 8133518 | 4/1982 | Germany . |
| 3337999A1 | 5/1984 | Germany . |
| 3606707A1 | 9/1987 | Germany . |
| 3708106A1 | 9/1988 | Germany . |
| 3938724A1 | 5/1991 | Germany . |
| 19631384C1 | 10/1997 | Germany . |

OTHER PUBLICATIONS

German Search Report, Aug. 19, 1998.

*Primary Examiner*—Rodney H. Bonck
*Assistant Examiner*—Tisha D. Waddell
*Attorney, Agent, or Firm*—Evenson, McKeown, Edwards & Lenahan, P.L.L.C.

[57] ABSTRACT

A driving connection is provided for torque transmission in the drive train of a motor vehicle for releasable connection of a crankshaft with a coaxial hydrodynamic torque converter. A torsional vibration damper located outside the torque converter is interposed between the crankshaft and the torque converter. The connection between the torque converter and the torsional vibration damper is a shaft-hub connection provided with lengthwise teeth.

24 Claims, 1 Drawing Sheet

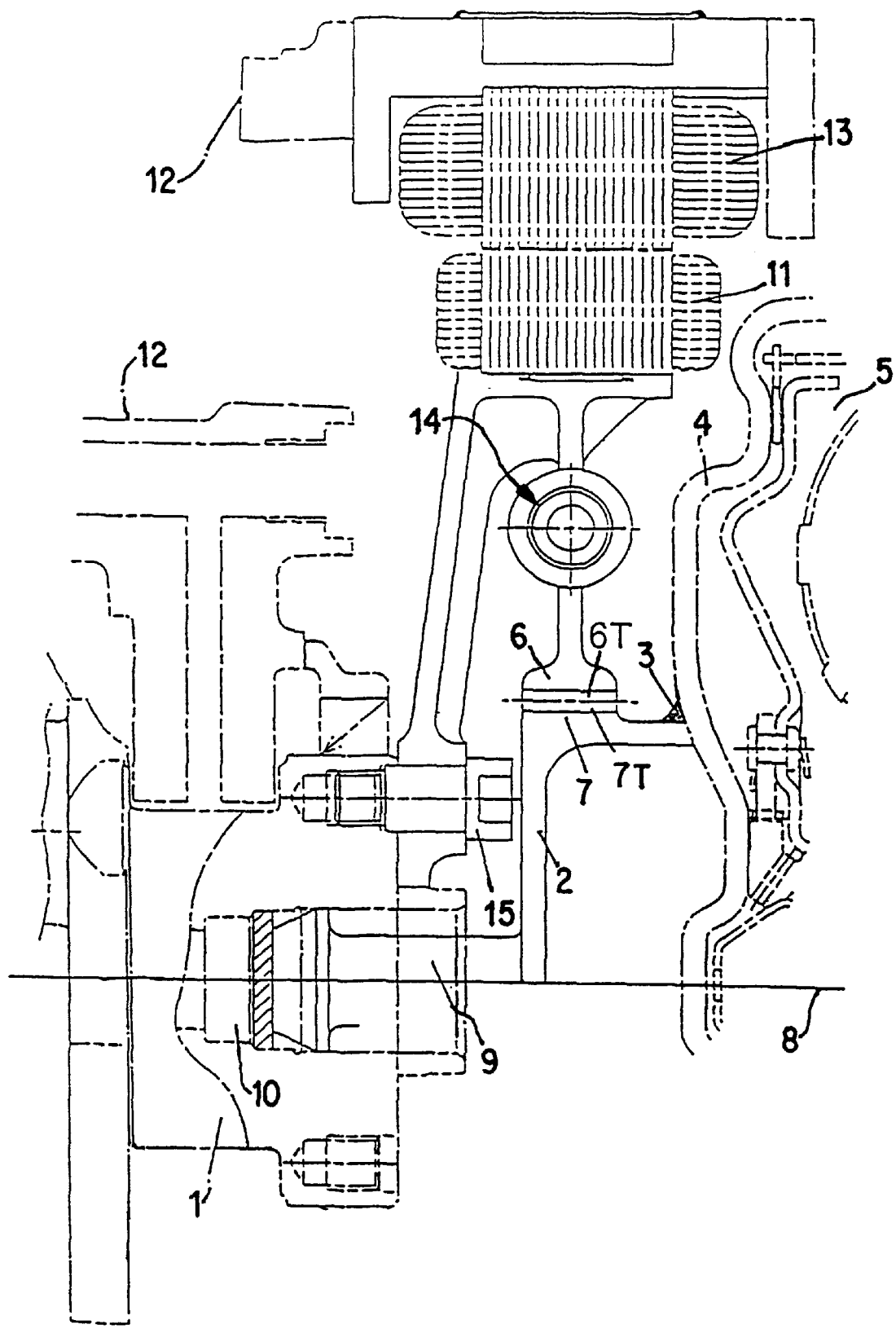

TORQUE TRANSMITTER CONNECTION ASSEMBLY WITH VIBRATION DAMPER AND METHOD OF MAKING SAME

BACKGROUND AND SUMMARY OF THE INVENTION

This application claims the priority of German Patent Application No. 197 47 963.4, filed Oct. 30, 1997, the disclosure of which is expressly incorporated by reference herein.

The invention relates to a torque converter connection to a crankshaft in the drive train of a motor vehicle, with interposition of a torsional vibration damper located outside the torque converter.

It is already known to connect a torque converter with a crankshaft with interposition of a torsional vibration damper. German Patent Document DE 36 06 707 A1 describes such an arrangement whose assembly is possible only with difficulty and expense.

Hence an object of the invention is to provide a releasable connection between the torque converter and a crankshaft with interposition of a torsional vibration damper that can be installed simply.

This object is achieved according to the invention by providing an arrangement wherein the connection between the torque converter and the torsional vibration damper is a shafthub connection provided with lengthwise teeth.

According to the invention, a driving connection for torque transmission is provided in the drive train of a motor vehicle for releasable connection of a crankshaft to a coaxial hydrodynamic torque converter with interposition of a torsional vibration damper located outside the torque converter, with the connection between the torque converter and the torsional vibration damper being a shaft-hub connection provided with lengthwise teeth.

Connecting the torque converter and torsional vibration damper by a shaft-hub connection provided with lengthwise teeth has the advantage that the torque converter connection can be mounted simply. For this purpose, the torsional vibration damper and torque converter need only be pushed together in the axial direction so that the Lengthwise teeth on the shaft and hub mesh with one another.

In preferred embodiments of the invention, the hub or shaft with lengthwise teeth on the torque converter and the matching element of the shaft-hub connection are mounted on the torsional vibration damper.

This has the advantage that the torque-transmitting connection between the torsional vibration damper and the torque converter consists of very few parts that can be assembled at low cost.

In addition, the invention prevents separation of the lengthwise teeth since the torsional vibration damper decouples the torque converter from the torsional vibrations of the crankshaft.

In addition, axial and radial tolerances are compensated by the lengthwise teeth.

In one advantageous embodiment of the invention, a rotor of an electrical machine is formed at the torsional vibration damper. Thus the rotor, as it turns, can operate as an electrical machine together with a stator mounted on the crankcase. In this way the electrical machine can operate as both a motor and a generator. During motor operation, an operating mode as the starter motor for the internal combustion engine is also possible in particular.

Another advantageous feature of embodiments of the invention provides that the torque converter and crankshaft have a shapewise centering connection that acts at least in the radial direction. This centering connection between the torqueconverter and the crankshaft is so designed that it is initially created when the torque converter is displaced in the direction of the crankshaft during assembly. It is only after the installation of the centering connection that the lengthwise teeth of the shaft and hub are pushed into one another by further displacement of the torque converter toward the crankshaft, to produce the connection between the torque converter and the torsional vibration damper. This has the advantage that even simpler and more reliable assembly is guaranteed.

Other objects, advantages and novel features of the present invention will become apparent from the following detailed description of the invention when considered in conjunction with the accompanying drawing.

BRIEF DESCRIPTION OF THE DRAWING

The single drawing FIGURE is a schematic partial sectional view which shows the connection of a crankshaft to a hydrodynamic torque converter with interposition of a torsional vibration damper constructed according to a preferred embodiment of the invention.

DETAILED DESCRIPTION OF THE DRAWING

A torsional vibration damper 14 is mounted at one end portion of a crankshaft 1 by bolts 15. This damper is designed with a hub 6 with lengthwise teeth 6T for its connection to a hydrodynamic torque converter 5 at the connection point, said hub being pushed onto a driving flange 2 of hydrodynamic torque converter 5, designed as a shaft 7 with lengthwise teeth 7T. Driving flange 2 is permanently connected by a welded seam 3 to housing 4 of torque converter 5.

In addition, a centering pin 9 is mounted on driving flange 2, with rotational symmetry with respect to rotational axis 8, said pin projecting into a centering bore 10 of crankshaft 1 and centering torque converter 5 in crankshaft 1. The shapewise centering connection that acts in the radial direction between torque converter 5 and crankshaft 1 is created when torque converter 5 is pushed in the direction of crankshaft 1 during assembly. It is only after the centering connection has been made that the lengthwise teeth 7T of shaft 7 are pushed onto those teeth 6T of hub 6 by additional displacement of torque converter 5 toward crankshaft 1, to produce the connection between torque converter 5 and torsional vibration damper 14.

In addition, rotor windings 11 are also provided on torsional vibration damper 14, so that the damper works as an electrical machine as it turns, together with stator windings 13 mounted on a crankcase 12. The electrical machine can then be operated as both a motor and a generator. During motor operation, an operating mode as the starter motor for the internal combustion engine is also provided in particular.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Driving connection for torque transmission in the drive train of a motor vehicle for a releasable connection of a crankshaft with a coaxial hydrodynamic torque converter with interposition of a torsional vibration damper located outside the torque converter, wherein the connection between the torque converter and the torsional vibration damper is a shaft-hub connection provided with lengthwise teeth, and wherein a rotor of an electrical machine is formed on the torsional vibration damper.

2. Driving connection according to claim 1, wherein one of a hub and a shaft with lengthwise teeth in the shaft-hub connection is mounted on a torque converter housing.

3. Driving connection according to claim 1, wherein one of a shaft and a hub with lengthwise teeth in the shaft-hub connection is mounted on the torsional vibration damper.

4. Driving connection according to claim 2, wherein one of a shaft and a hub with lengthwise teeth in the shaft-hub connection is mounted on the torsional vibration damper.

5. Driving connection according to claim 1, wherein the electrical machine can be operated as both a motor and a generator.

6. Driving connection according to claim 1, wherein a shapewise centering connection acting at least in a radial direction exists between the torque converter and the crankshaft.

7. Driving connection according to claim 1, wherein the electrical machine can be operated as both a motor and a generator.

8. Driving connection according to claim 4, wherein a shapewise centering connection acting at least in a radial direction exists between the torque converter and the crankshaft.

9. A motor vehicle drive train assembly comprising:
an engine crankshaft;
a hydrodynamic torque converter disposed coaxially with the crankshaft;
a torsional vibration damper disposed outside the torque converter;
a releasable shaft-hub connection between the torque converter and the torsional vibration damper, said shaft-hub connection including interengaging lengthwise teeth extending parallel to the crankshaft axis; and
a rotor of an electrical machine being coupled to said torsional vibration damper on a side opposite said shaft-hub connection.

10. A motor vehicle drive train assembly according to claim 9, further comprising a shapewise centering connection interposed between the torque converter and crankshaft to center the torque converter with respect to the crankshaft.

11. A motor vehicle drive train assembly according to claim 10, wherein the centering connection is configured to center the torque converter on the crankshaft before engagement of the lengthwise teeth when the torque converter is assembled in an axial direction on the crankshaft.

12. A motor vehicle drive train assembly according to claim 9, wherein said electrical machine is an engine starter motor with a stator winding carried by an engine crankcase housing.

13. A method of making a motor vehicle drive train assembly comprising:
providing an engine crankshaft rotatably mounted in an engine crankcase housing;
connecting a torsional vibration damper to the engine crankcase housing;
disposing a hydrodynamic torque converter coaxially with the crankshaft;
releasably connecting the torque converter and torsional vibration damper by axially moving the torque converter relative to the torsional vibration damper with interengagement of axially extending teeth on a torque converter driving flange and on a vibration damper hub; and
coupling a rotor of an electrical machine to said torsional vibration damper on a side opposite said shaft-hub connection.

14. A method according to claim 13, further comprising cent ring the torque converter on the crankshaft by means of engageable centering surfaces which engage one another to center the torque converter during initial axial movement of the torque converter towards a position where the axially extending teeth engage one another.

15. A motor vehicle drive train assembly comprising:
a hydrodynamic torque converter;
a torsional vibration damper,
an output side of said torsional vibration damper being coupled to an input side of said hydrodynamic torque converter via a toothed connection; and
a rotor of an electrical machine, said rotor being coupled to an input side of said torsional vibration damper.

16. A motor vehicle drive train assembly according to claim 15, wherein said toothed connection comprises a hub coupled to said torsional vibration damper, and a shaft coupled to said hydrodynamic torque converter, said hub and shaft having interengageable teeth.

17. A motor vehicle drive train assembly according to claim 15, further comprising an engine crankshaft coupled to said input side of said torsional vibration damper.

18. A motor vehicle drive train assembly according to claim 16, further comprising an engine crankshaft coupled to said input side of said torsional vibration damper.

19. A motor vehicle drive train assembly according to claim 17, further comprising a centering connection including a centering pin coupled to said hydrodynamic torque converter and a centering bore defined by said engine crankshaft, said centering bore receiving said centering pin.

20. A method of assembling the motor vehicle drive train assembly of claim 19, comprising:
positioning said hydrodynamic torque converter and said crankshaft such that said centering pin and said centering bore are adjacent each other and at least approximately coaxial;
moving said hydrodynamic torque converter and said crankshaft axially relative to each other such that said centering pin is disposed in said centering bore.

21. A motor vehicle drive train assembly according to claim 18, further comprising a centering connection including a centering pin coupled to said hydrodynamic torque converter and a centering bore defined by said engine crankshaft, said centering bore receiving said centering pin.

22. A motor vehicle drive train assembly according to claim 21, wherein said centering connection is configured to center said hydrodynamic torque converter relative to said crankshaft before interengagement of said teeth when the hydrodynamic torque converter is assembled in an axial direction on the crankshaft.

23. A method of assembling the motor vehicle drive train assembly of claim 21, comprising:
positioning said hydrodynamic torque converter and said crankshaft such that said centering pin and said centering bore are adjacent each other and at least approximately coaxial;
moving said hydrodynamic torque converter and said crankshaft axially relative to each other such that said centering pin is disposed in said centering bore and said teeth interengage.

24. A method according to claim 23, wherein during said moving act, said centering pin centers said hydrodynamic torque converter relative to said crankshaft before interengagement of said teeth.

* * * * *